United States Patent Office 3,555,782
Patented Jan. 19, 1971

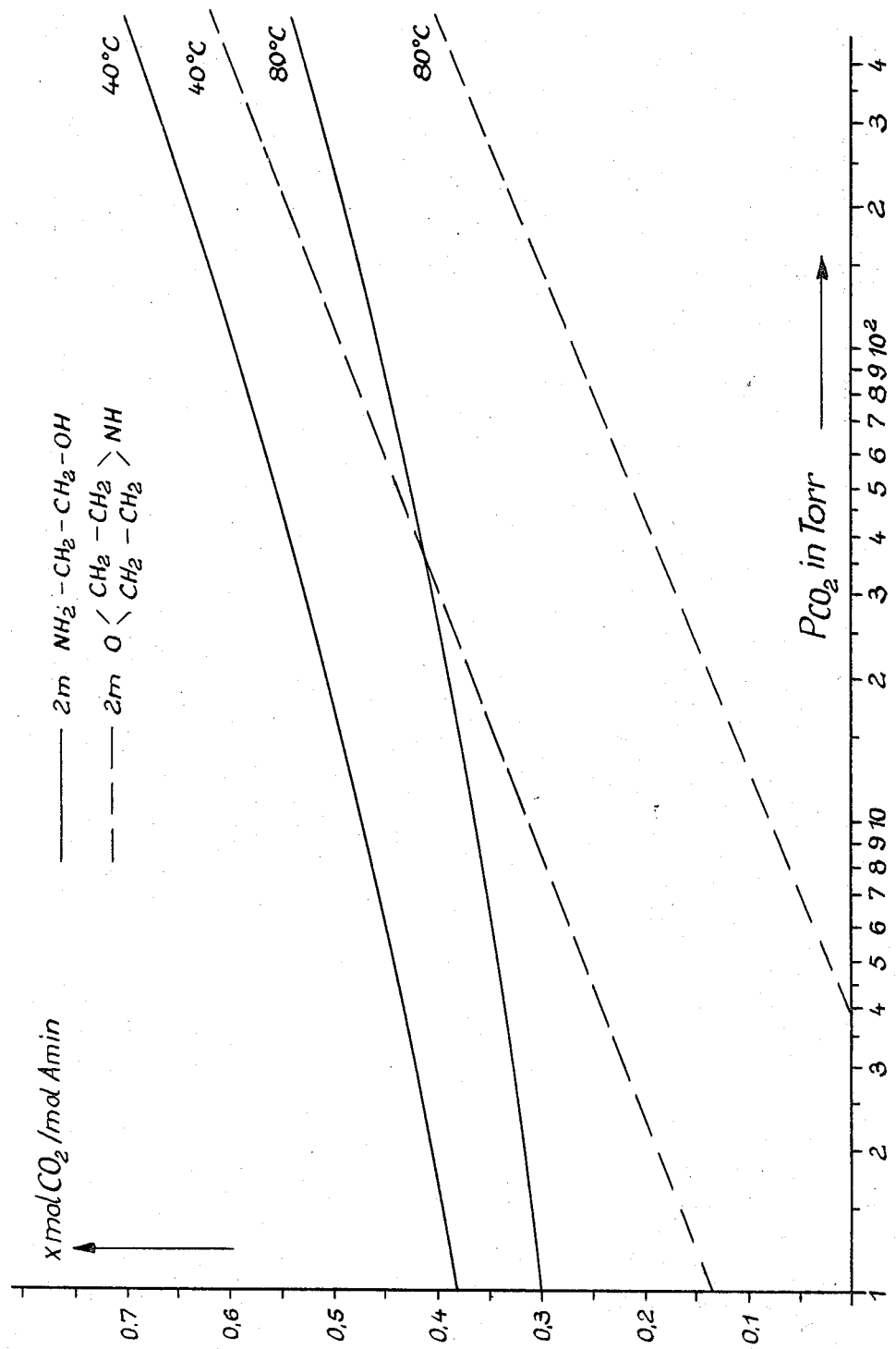

3,555,782
PROCESSES OF REMOVING ACIDIC
COMPONENTS FROM GASES
Hans Deringer, Essen, Germany, assignor to Heinrich
Koppers, Gesellschaft mit beschrankter Haftung, Essen,
Germany
Filed Dec. 30, 1968, Ser. No. 787,766
Claims priority, application Germany, Jan. 4, 1968,
1,719,490
Int. Cl. B01d 19/00
U.S. Cl. 55—48
14 Claims

ABSTRACT OF THE DISCLOSURE

The acidic components present in gases such as $CO_2$, $H_2S$ and HCN are removed by subjecting the gases to a wash treatment with a solution of morpholine or a C-substituted morpholine so as to absorb at least part of said acidic components.

BACKGROUND OF THE INVENTION

The present invention relates to a process for removal of acidic components, such as $CO_2$, $H_2S$ and HCN, from gases by a washing treatment with means that absorb the said acid components.

Removal of such acid components from gases by means of a suitable wash solution is known. It is also known to drive off the acid components absorbed in the wash solution subsequently by suitable means such as heating or pressure release. In this connection, a number of acid solutions have been proposed for use.

For instance, aqueous solutions of strong organic bases or of alkali salts of weak inorganic or organic acids such as aqueous solutions of ethanol amines, soda or potash have been used in industrial processes. It has also been proposed to use esters such as propylencarbonate, glycerintriacetate, methoxytriglycolacetate or butylcarbitolacetate.

It has also been proposed to employ certain heterocyclic organic compounds such as derivatives of piperidine.

However, the use of all these known compounds has not been free of distinct drawbacks. For instance, processes that employ alkaline wash solution require a substantial heat input. In cases where the acid components are present at a high partial pressure, the use of physically acting absorbents is therefore more economical.

There is also very often a substantial loss of reagent which is due to decomposition and is of substantial importance in case of the concentrations employed in the industrial processes. The reagents themselves and the products of their decomposition can also cause a noticeable corrosion in the metal parts of the apparatus.

If the gases contain $H_2S$ there is an objectionable formation of colloidal sulfur in the solution followed by metal sulfide formation. This may cause rather expensive filtration and purification of the drainage canals to be necessary.

With some of the compounds, such as butylcarbitol-acetate, there is also a comparatively high price which is an objection to the large-scale use, the price being due to the comparatively complicated chemical structure.

As the best absorption means have usually been considered the ethanolamines. However, these compounds require comparatively high temperatures for regeneration. They have furthermore a tendency to cause side reactions if, for instance, the gases contain organic sulfur compounds such as mercaptans or thiopene and perhaps also $CS_2$. The ethanol amines result in the formation of strongly foaming side products which interfere with the washing process. The ethanol amines are also quite sensitive against oxygen.

A number of processes have therefore become known which use only pure water and a higher pressure for the removal of the acid components. The shortcoming of this type of process is the slow solubility of the acid components in water. It has also been found with this type of process that the simultaneous presence of $H_2S$ and $CO_2$ in an average more or less equal concentrations makes it very difficult to separate the $H_2S$, particularly if the process is carried out a very high pressure. Furthermore, even minute amounts of liquid hydrocarbons very often cause foaming which reduces the effectiveness of the pressure-washing process and interferes with the results.

SUMMARY OF THE INVENTION

The present process avoids the shortcomings of the processes of the prior art by removing the acidic components from gases by means of a wash treatment with a solution of morpholine or of a C-substituted morpholine which solution is adapted to absorb at least a substantial part of the acidic components.

This type of washing solution is particularly suited for gases containing $CO_2$, $H_2S$ and HCN.

The spent wash solution may then be regenerated and recirculated if the process is carried out in a continuous manner.

BRIEF DESCRIPTION OF THE DRAWING

The drawing shows in a diagram the absorptive capacity of a morpholine solution compared with a monoethanol amine, the capacity being shown dependent on a $CO_2$ partial pressure indicated on semilogarithmic scale.

DESCRIPTION OF THE PREFERRED EMBODIMENTS

Gases for which the treatment of the invention is designed originate principally in the combustion, low temperature coking and also high temperature coking of solid and liquid fuels. The invention is furthermore applicable to acidic components containing gases that are formed in general chemical and metallurgical process, including flue gases from blast furnaces. However, the gases in all cases must, as such, be substantially inert to the morpholine.

The solution of the morpholine or the C-substituted morpholine which is used in the invention may be prepared either with water or with an organic solvent such as an alcohol. Although water in general is to be considered the cheapest solvent, there may be cases where it is advantageous to use the organic solvents, for instance, ethyl alcohol, isopropyl alcohol or isobutyl alcohol, because of their more favorable physical properties. Methyl alcohol, because of its low boiling point, can be used only if the gases are not at a very high temperature.

The washing potency for the sour components of the solutions of morpholine or C-substituted morpholine is at least as good as that of the ethanol amines. The morpholine or C-substituted morpholine, however, has the advantage over the ethanol amine that it has a more marked dependency on the temperature in its absorptive capacity in respect to the acidic components. In other words, the charged washing solution can be regenerated with greater ease at lower temperatures than would be the case with ethanol amines.

The morpholine and the C-substituted morpholine is also distinguished over the ethanol amines by the freedom from side reactions. For instance, the foaming side products which develop if the gases contain organic sulfur compounds or also $CS_2$ are avoided with the compounds of the invention. Likewise, the compounds of the invention are less sensitive to oxygen.

The use of morpholine or C-substituted morpholine has also a substantial advantage over compounds of somewhat similar structure, such as piperidine derivatives, since morpholine and morpholine derivatives are considerably cheaper than the piperidine derivatives. The piperidines which are substituted only to a small extent have in addition a comparatively high vapor pressure, while the piperidines with heavier substitution have a tendency to cause foaming.

The C-substituted morpholines which may be used in connection with the invention may be those having pure carbon substituents, preferably 2-methylmorpholine or also 2-ethyl, 2-propyl or 2-butyl morpholine. The number of carbon atoms in the substituent may for instance be from 1 to 6.

The substituent group, however, may in turn be substituted otherwise than by a hydrocarbon group, such as for instance, in case of 2-ketomorpholine.

It has, however, been found that the substituents must be attached to one of the carbon atoms. The N-substituted morpholines are not particularly effective for the purpose of the invention.

It will be understood that morpholine as such and C-substituent morpholines may be employed also together in a mixture.

A wide range of concentrations may be used for the solution, for instance, from 0.5 to 5 molar solutions.

The solution of the morpholine or C-substituted morpholine is suited not only to wash out $CO_2$ from the gases. As extended tests have shown, it can be used broadly for washing out other acidic components such as, for instance, $H_2S$ and HCN. The removal of the acidic components can be carried out at normal or also at superatmospheric pressure.

The acidic components can then be driven off from the charged washing solution by pressure reduction and/or by stripping with an inert gas or steam, and the solution can thus be recirculated into a continuously-operated process.

With reference to the drawing, it will be noted that the curves shown confirm the statements made. These curves are for a 2 molar solution or morpholine as compared with a 2 molar solution of monoethanol amine. The solutions are aqueous solutions and the washing is effected as shown at 40 or 80° C. The curves confirm that the interrelation between temperature and absorptive capacity is considerably more marked with morpholine than with monoethanol amine. The advantage thus obtained is best illustrated by the following comparative test.

EXAMPLE

A gas containing 10 vol. percent $CO_2$ was subjected to washing at a temperature of 40° C. and a pressure of 1 atmosphere in a packed column in countercurrent with a 2 molar aqueous morpholine solution. The amount of morpholine solution was 10 liters per 1000 liters of gas The terminal gas after completion of the washing treatment contained 0.7 vol. percent of $CO_2$. The recirculated solution was regenerated in each case with 80°C. steam.

The same gas was then also washed at the same temperature employing the same amounts of solution and the same amount of stripping steam but using a 2 molar monoethanol amine solution. In this case, a terminal gas was obtained which contained 3.05 vol. percent of $CO_2$.

In order to obtain a terminal gas containing 0.7 vol. percent of $CO_2$, if using a monoethanol amine solution, it would be necessary to increase the amount of washing solution to 15 liters per 1000 liters of gas or to increase the temperature to 100° C. In either case, there would be an increase of the amount of necessary steam by about 50% compared with the process where a morpholine solution was used.

I claim:
1. The process of removing components from gases comprising subjecting the gases to a wash treatment with a solution of morpholine or of a C-substituted morpholine so as to absorb at least a substantial part of said acidic components.
2. The process of claim 1, wherein the washing treatment is carried out at a pressure above atmospheric pressure.
3. The process of claim 1, wherein the washing treatment is carried out at atmospheric pressure.
4. The process of claim 1, wherein the washing treatment is carried out at a temperature between 40 and 80° C.
5. The process of claim 1, wherein the solution of morpholine or a C-substituted morpholine is an aqueous solution.
6. The process of claim 1, wherein the solution of morpholine or a C-substituted morpholine is an alcoholic solution.
7. The process of claim 1, wherein the solution of morpholine or the C-substituted morpholine is a 2-molar solution.
8. The process of claim 1, wherein the washing solution is a solution of 2-methylmorpholine.
9. The process of claim 1, wherein the washing solution is a 2-keto-morpholine solution.
10. The process of claim 1, wherein the acidic components comprise $CO_2$, $H_2S$ or HCN or two or more of these components.
11. The process of claim 1, wherein the washing solution is a mixture of a solution of morpholine and a solution of C-substituted morpholine.
12. The process of claim 1, which is carried out in a continuous manner and which includes the step of regenerating the spent washing solution by a pressure reduction followed by recirculating the regenerated solution.
13. The process of claim 1, which is carried out in a continuous manner and includes the step of regenerating the spent washing solution by stripping with an inert gas or steam followed by recirculating the regenerated solution.
14. The process of claim 1, which is carried out in a continuous manner and which includes the step of regenerating the spent washing solution by a pressure reduction and by stripping with an inert gas or steam followed by recirculating the regenerated solution.

References Cited

UNITED STATES PATENTS

| | | | |
|---|---|---|---|
| 3,191,361 | 6/1965 | Topsoe | 55—68X |
| 3,242,646 | 3/1966 | Miller et al. | 55—48 |
| 3,350,847 | 11/1967 | Woertz et al. | 55—73X |

SAMIH N. ZAHARNA, Primary Examiner

R. W. BURKS, Assistant Examiner

U.S. Cl. X.R.

55—73